July 7, 1964

N. R. SEAMAN 3,139,998

SELF-UNLOADING APPARATUS

Filed Oct. 9, 1962

INVENTOR.
NORMAN R. SEAMAN
BY Hamilton & Cook
ATTORNEYS

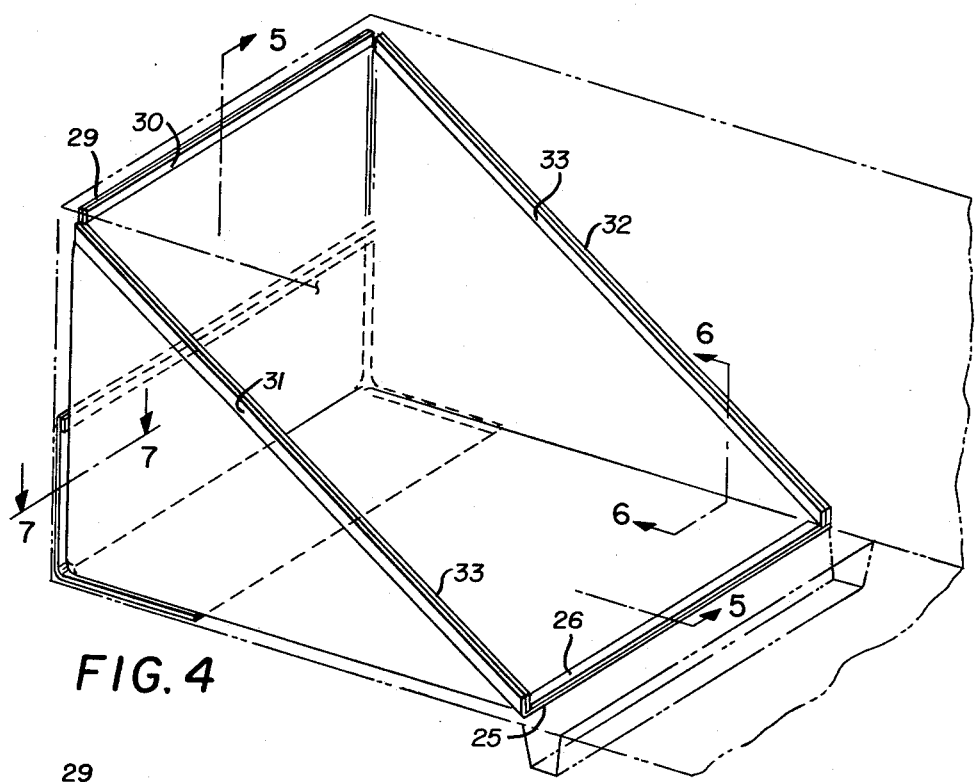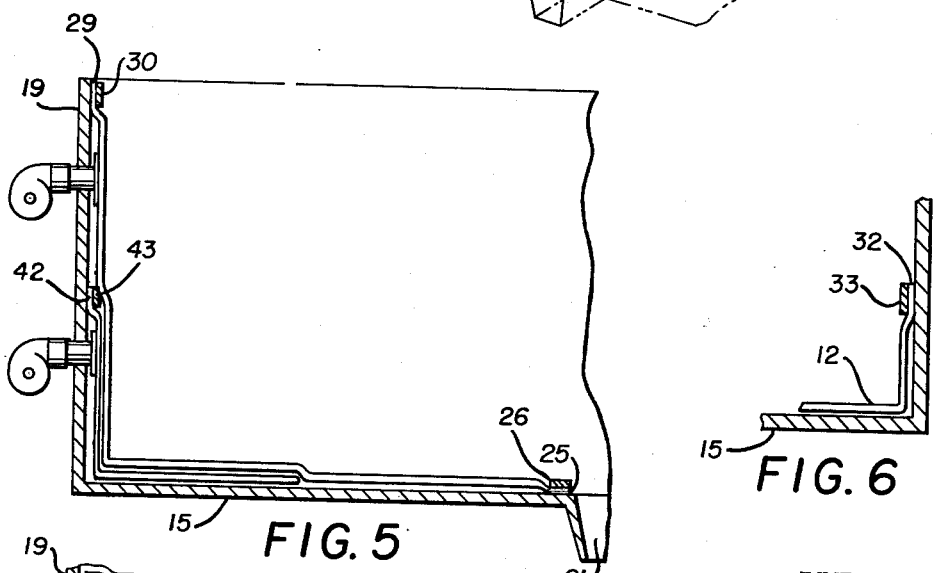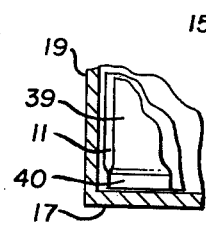

July 7, 1964

N. R. SEAMAN 3,139,998

SELF-UNLOADING APPARATUS

Filed Oct. 9, 1962

INVENTOR.
NORMAN R. SEAMAN

BY Hamilton & Cook

ATTORNEYS

United States Patent Office 3,139,998
Patented July 7, 1964

3,139,998
SELF-UNLOADING APPARATUS
Norman R. Seaman, Holmesville, Ohio, assignor to Domestic Film Products Corporation, Millersburg, Ohio, a corporation of Ohio
Filed Oct. 9, 1962, Ser. No. 229,416
6 Claims. (Cl. 214—82)

The present invention relates generally to unloading systems. More particularly, the present invention relates to pneumatic systems which provide self-unloading for compartments containing granular or comminuted material. Specifically, the invention relates to an unloading system utilizing a primary, high pressure, inflatable means for initial discharge of the granular material and a secondary, low-pressure, inflatable means for discharging the remainder of said granular material.

Granular materials, such as grains, flour, cement, and especially slag or lime stone have angles of repose generally in excess of 30°, some being as high as 50 to 55°, so that a hopper or compartment for transportation of these granular materials, if they are to be discharged by gravity, must have steeply sloped, funnel-liked floors. However, such a shape is particularly unsuitable for transportation compartments because of the resulting high center of gravity and because of the waste space required to provide the deeply sloped floor of the compartment.

In order to permit utilization of the more efficient flat-bottom transportation compartments, blower systems have been developed which can discharge granular material. These systems work well with cement and certain grains, so long as the individual particles are smooth, fine and light in weight. However, such installations are not only limited in their application, but are also expensive to install and maintain and subject to wear if the particles have rough or sharp edges.

A less expensive second type unloading device has been developed which is suitable for use when only a light load is required to be discharged by the device. The lightness in weight being attributable either to the low specific gravity or small bulk of the material. This type unloading device comprises an inflatable bag positioned in the compartment to overlie the floor between the walls and the discharge opening in the floor. It is lucidly disclosed in U.S. Patent No. 2,931,523 to Thomas P. Nelligen, which issued on April 5, 1960. Summarizing the operation of such device, material is discharged by gravity flow through an opening in the floor of the compartment. Thereafter, the bag is inflated to force the remaining material out through the discharge opening. A close study of the unloading device disclosed in U.S. Patent No. 2,931,523 reveals that the weight of the granular material between the floor of the compartment and the repose line of the material must be lifted by the bag to initiate forced discharge after the gravity discharge has been completed. To lift this material the bag fabric at the juncture of the floor and the end wall is subjected to the entire weight of the remaining load. Furthermore, it has been found that the pressure required to initially lift the load may often exceed the strength of the side walls of the compartment.

Therefore, it is an object of the present invention to provide an improved inflatable, self-unloading apparatus capable of unloading very heavy granular materials.

It is another object of the present invention to provide an inflatable self-unloading device in which the utilization of high pressure inflation does not apply excessive slide pressure on the compartment.

It is a further object of the present invention to provide an inflatable, self-unloading apparatus, as above, which can with facility be installed in, and removed from, a standard transportation compartment without modification of the compartment.

It is a still further object of the present invention to provide an inflatable, self-unloading device as above which is economical to manufacture, install and maintain.

These and other objects which will become apparent from the following specification are accomplished by means hereinafter described and claimed.

One preferred embodiment is shown by way of example in the accompanying drawings and described in detail without attempting to show all of the various forms and modifications in which the invention might be embodied; the invention being measured by the appended claims and not by the detail of the specification.

In the drawings.

FIG. 4 is a perspective view of the secondary inflatable bag deflated to show the means for attaching it to the compartment;

FIG. 5 is a cross-section taken substantially on line 5—5 of FIG. 4;

FIG. 6 is a cross-section taken substantially on line 6—6 of FIG. 4;

FIG. 7 is a cross-section taken substantially on line 7—7 of FIG. 4;

Figure 1:
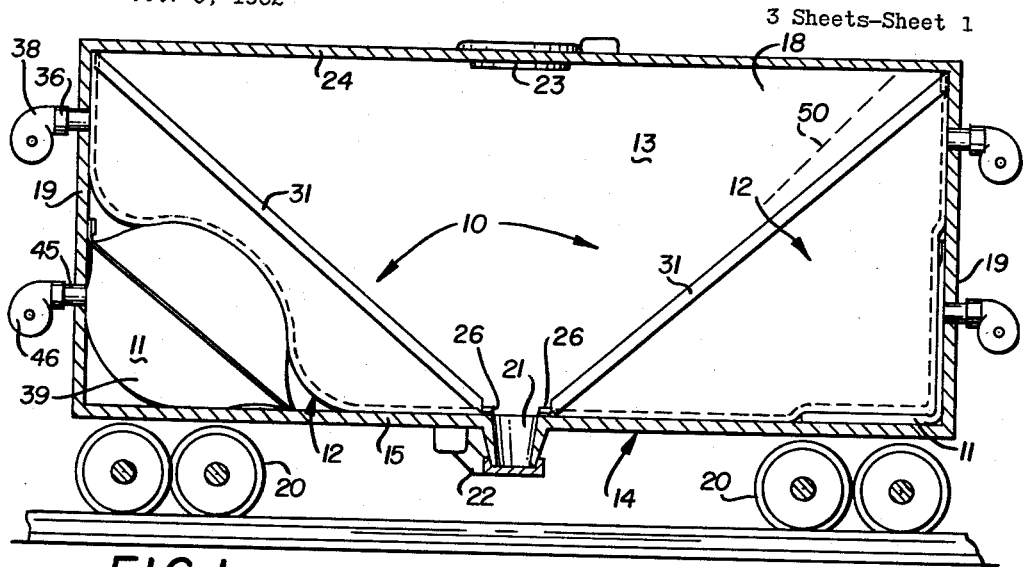
FIG. 1 is a side elevation of a transportation compartment in the form of a boxcar, with the near wall broken away, employing an air inflatable, self-unloading apparatus according to the present invention; on the right the device is fully deflated, and on the left the primary pillow is inflated and the secondary bag deflated.

In general, an inflatable, self-unloading apparatus according to the present invention is utilized in conjunction with a storage or transportation compartment having a floor, opposed side walls, at least one end wall extending upwardly from the floor between said side walls and a discharge opening in said floor outwardly of said end wall. The apparatus itself comprises an inflatable primary chamber or pillow-like member and an inflatable secondary chamber or bag.

The pillow is secured to the compartment so as to overlie the floor at the juncture of the floor and the end wall and is so constructed as to be expansible transversely of its longitudinal axis, which is oriented to extend between the side walls, and yet retain a substantially constant longitudinal dimension upon inflation.

The secondary chamber or bag is also secured in the compartment and is positioned to overlie the pillow and the remainder of the floor between the discharge opening and the wall.

In order that the apparatus properly functions, pump or blower means must be provided whereby the pillow and bag can be sequentially inflated—the pillow at a high pressure and the bag at a considerably lower pressure.

Turning now to the drawings, the improved, self-unloading apparatus, designated generally by the numeral 10, comprises a primary chamber or pillow-like member 11 (when inflated) and a secondary chamber, or bag, 12. The self-unloading apparatus 10 is environmentally disclosed in the transporting compartment 13 of a railway boxcar 14. The car 14 is provided with a floor 15, side walls 17 and 18 and end walls 19 extending upwardly from the floor 15 between said side walls 17 and 18. The boxcar 14 is supported on wheeled trucks 20 and has a discharge slot 21 in the floor 15 which extends between the side walls 17 and 18 medially of the wheeled trucks 20. In the environment shown, a self-unloading apparatus 10 is positioned on either side of the discharge slot 21.

A gate 22 is operatively mounted to open and close the discharge slot 21 to the passage of the granular material carried in the compartment 13 and one or more ports 23 are provided in the ceiling 24 to provide a means for filling the compartment 13.

Figure 10:
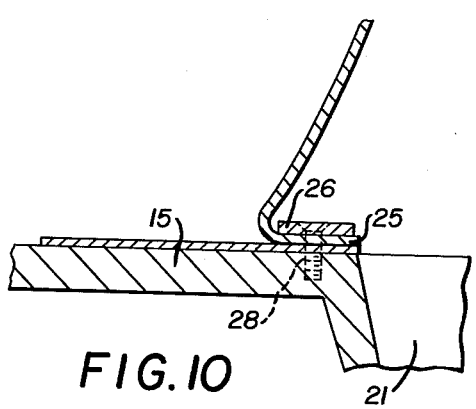
FIG. 10 is a cross-section taken substantially on line 10—10 of FIG. 8.

A secondary chamber, or bag 12 is made of a flexible, air impervious material, such as nylon, rubberized fabric or the like and is provided with end or side seams or flanges which facilitate securing the bag properly within the compartment. The lower, or front seam, or flange, 25 is attached along the side, or adjacent the edge, of discharge slot 21 by a rigid plate 26 (FIG. 10) secured to the floor 15, as by bolts 28. The upper, or rear, flange 29 is similarly secured to the end wall 19 by a rigid bar 30 (FIG. 5) along a horizontal line spaced well above the floor 15.

The side flanges 31 and 32 are secured to the side walls 17 and 18, respectively, by a similar mounting bar 33 on each side, preferably along substantially parallel lines slanting upwardly from adjacent the discharge slot 21 to the end wall 19. The thus defined peripheral anchoring of the secondary chamber, or bag, 12 divides bag 12 into upper and lower membranes 34 and 35, respectively.

A conduit 36 extends through the lower membrane 35 to connect the interior of the bag 12 with a pump, or blower means, schematically represented at 38 which selectively inflates or deflates the bag 12 as hereinafter more fully explained in connection with the operation of the unloading apparatus.

The primary chamber, or pillow, 11 is similarly constructed of a flexible, air impervious material such as nylon, rubberized fabric or the like which is constructed so as to be expansible transversely of the longitudinal axis, oriented to extend between side walls 17 and 18, upon inflation and yet maintain a constant longitudinal dimension. This can be accomplished in one of several ways.

In the embodiment disclosed, pillow 11 is formed of a single piece of material 39 folded over with air impervious seams along the three over-lapping edges thus formed. The longitudinal axis extends between the two opposed seams 40 and 41 so that the longitudinal axis of the pillow is parallel to the third seam 42. The dimension of this third seam 42 is preferably substantially equal to, but in no event greater than, the dimension between the side walls 17 and 18, between which the longitudinal axis extends, so that when the pillow is inflated there is no longitudinal extension of the pillow with resulting stresses against the side walls of the compartment. The required stability of the longitudinal dimension is further assured by the use of a fabric which is substantially free from stretching under the strain of the pressure applied during inflation. A similar result can be obtained by the use of inextensible ribs extending longitudinally between and attached to the opposed seams 40 and 41. Or, if pillow 11 were to be seamlessly made of a rubberized fabric, cord orientation in the fabric could be such as to prevent longitudinal expansion of the pillow upon inflation.

The primary chamber, or pillow, 11 is positioned in compartment 13 so as to overlie that portion of the floor 15 in proximity to the juncture of the floor and end wall 19. Pillow 11 is attached to the compartment, as by the mounting bar 43 along a horizontal line spaced above the floor but lower than bar 30 connecting the bag 12 to the end wall 19. Bar 43 attaches to the rear wall 19 by bolts 44 to grip the seam 43 tightly therebetween.

Conduit 45 extends through the material 39 from which the pillow 11 is formed to connect the interior of the pillow with a pump, or blower means, schematically represented at 46.

To unload a compartment 13 equipped with a self-unloading apparatus 10, hinged gate 22 is first swung to open discharge slot 21. This permits free flow of the granular material from the compartment 13. This free flow will continue by gravity until the upper surface of the material lies at its natural angle of repose—i.e., that angle, measured in a vertical plane, between the upper surface of the material and a horizontal plane at which the material will no longer flow by gravity of the discharge slot. This angle will vary widely from material to material, being as low as 30° for many smooth surface grains and pulverlant material, and as high as 50 to 55° for rough textured granular material, such as limestone. An angle of repose of approxmiately 45° is represented by the dotted line 50 on the righthand side of the compartment 13 in FIG. 1.

The granular material between the angularly inclined repose surface and the floor will remain in the compartment 13 unless it is forcibly discharged. To do so solely by the inflation of the secondary chamber or bag 12, the entire weight of the remaining material would be required to be lifted by the bag. In that event the entire weight would be carried by membrane 34. That would be too great a stress. Furthermore, if the membrane were made of sufficient strength to withstand this strain, or if the granular material remaining in the compartment were extremely heavy, the pressure within the bag 12 required to lift the material would be too excessive to be withstood by the side walls 17 and 18 against which the bag 12, because of its construction, also acts.

Therefore, according to the present invention, the primary chamber or pillow 11 is inflated upon completion of the free flow of the granular material from the chamber, as shown in the lefthand side of FIG. 1.

The pump, or blower, 46 forces air, or other suitable fluid into pillow 11 to conduit 45. It has been found that in the standard boxcar installation shown a pressure of up to three pounds per square inch is sufficient to inflate the pillow and cause continued discharge of even a very heavy granular material, such as limestone. Because the pillow 11 is contructed to be expansible transversely of the longitudinal axis for maintaining the constant dimension along the longitudinal axis, the forces resulting from the inflation pressure of the pillow react to lift the granular material upwardly from the floor 15 and toward the slot 21, but do not apply any additional pressure against the side walls 17 and 18.

Figure 2:
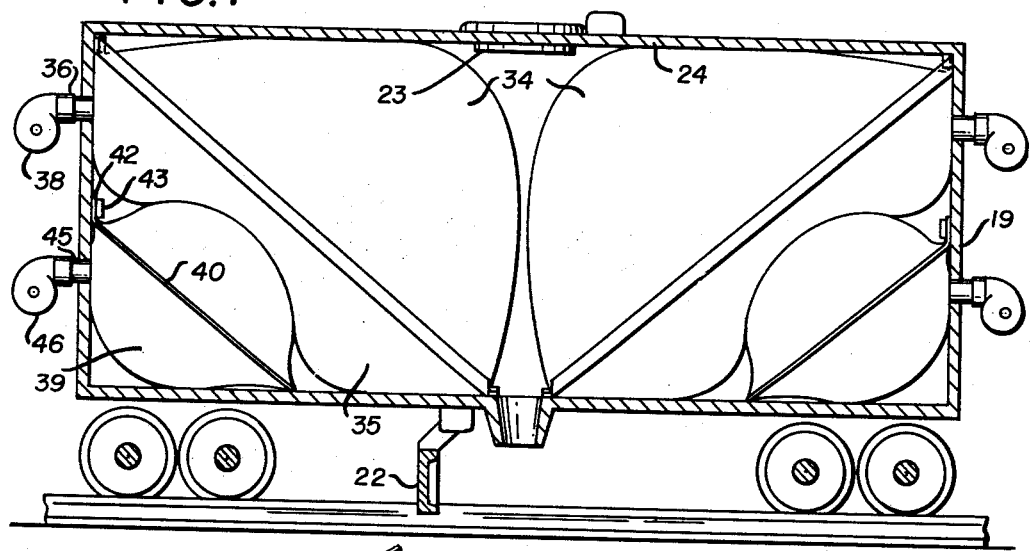
FIG. 2 is a view similar to FIG. 1 showing both of the inflatable pillows and the inflatable bags fully inflated as at the completion of the discharge operation.
Figure 3:
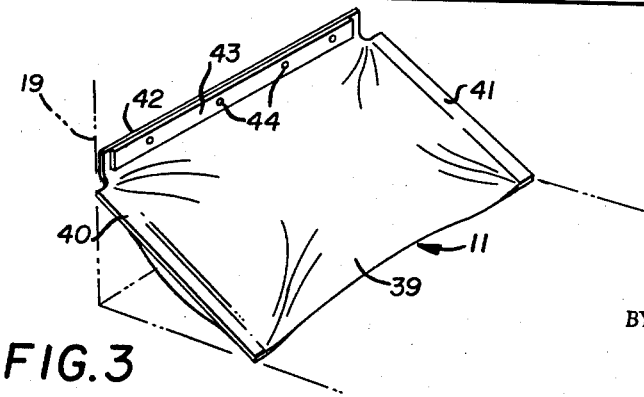
FIG. 3 is a perspective view of the primary pillow inflated.
Figure 8:
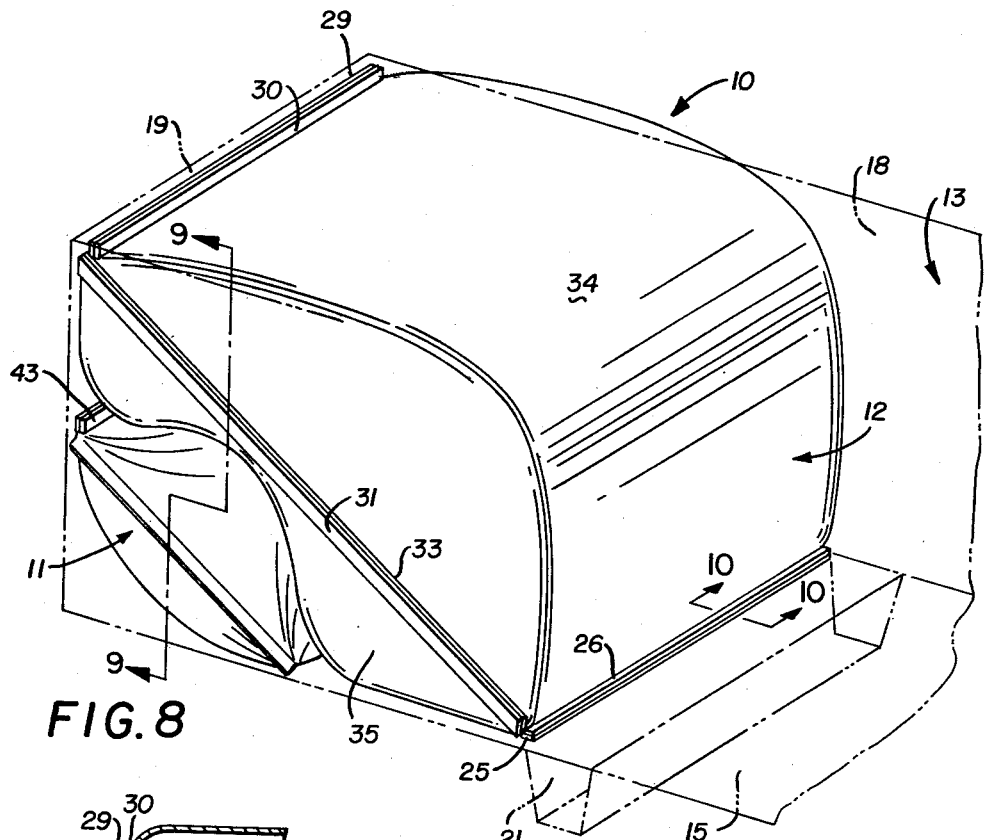
FIG. 8 is a perspective view similar to FIG. 4 showing both the primary pillow and the secondary bag inflated.
Figure 9:
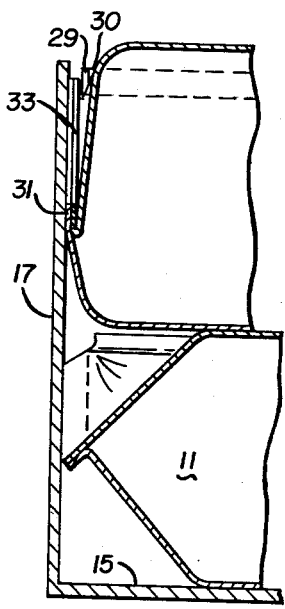
FIG. 9 is a cross-section taken substantially on line 9—9 of FIG. 8.

After the pillow or primary chamber 11 has been inflated, the secondary chamber, or bag, 12 is inflated (as in FIG. 2) by operation of pump, or blower, 38. It has been found that unloading of the material from the standard boxcar installation requiring up to three pounds per square inch pressure in the pillow 11 can be completed with a pressure of three-quarters of a pound per square inch in the bag 12. This not only reduces the pressure to one-quarter but also reduces the area of the side walls against which the bag 12 acts.

After the granular material has been completely discharged from the compartment, both the pillow and the bag are deflated to prepare the compartment for receipt of the next load. If desired, the pumps 38 and 46 may be reversible to mechanically withdraw the air within the pillow and bag, respectively.

It should be quite apparent that the unloading apparatus heretofore described can be readily installed in a standard boxcar, truck or any other compartment suitable for transportation of granular material without major reconstruction of the compartment. In fact in compartments separated by bulkheads the unloading apparatus could well be stored against the bulkhead and the bulkhead swung upwardly against the ceiling so as to store the entire unloading apparatus therebetween should it be desired to utilize the compartment for transportation of other than granular material.

However, irrespective of the particular environment in which it is employed, an unloading apparatus constructed according to the concepts of the present invention permits unloading of very heavy granular material without excessive pressures of the sidewalls of the compartments and otherwise accomplishes the objects of the invention.

What is claimed is:

1. A self-unloading apparatus for discharging granular material from a compartment having a floor, opposed side walls, an end wall extending upwardly from said floor between the said side walls and a discharge opening in the floor spaced inwardly of said end wall, comprising an inflatable primary chamber and an inflatable secondary chamber, said primary chamber having a pillow-like shape when inflated and being positioned in said compartment to overlie the intersection of said floor and said end wall, means for securing said primary chamber to said compartment, said inflatable secondary chamber positioned to overlie said primary chamber and said floor between said discharge opening and said end wall, means securing said secondary chamber to said compartment, and means to sequentially inflate said primary chamber and then said secondary chamber to lift the granular material above the angle of repose of said material to cause the material to slide to and out said discharge opening.

2. A self-unloading apparatus for discharging granular material from a compartment having a floor, opposed side walls, an end wall extending upwardly from said floor between the said side walls and a discharge opening in the floor spaced inwardly of said end wall, comprising a primary and secondary chamber, said primary chamber formed of a flexible, air impervious material to be inflatable, said primary chamber positioned in said compartment between said side walls to overlie the floor in proximity to the juncture of said floor and said end wall with the longitudinal axis of said pillow extending between said side walls, the longitudinal dimension of said primary chamber being no greater than the dimension between said side walls, means to inflate said primary chamber, means to maintain the longitudinal dimension of said primary chamber constant even upon inflation, said secondary chamber formed of a flexible, air impervious material positioned to overlie said pillow and said floor between said discharge opening and said end wall, sequential inflation of said primary chamber and said secondary chamber lifting the granular material above the angle of repose of said material to cause the material to slide to and out of said discharge opening.

3. A self-unloading apparatus for discharging granular material from a compartment having a floor, opposed side walls, and end wall extending upwardly from said floor between the said side walls and a discharge opening in the floor spaced inwardly of said end wall, comprising inflatable primary and secondary chambers, said primary chamber being secured in said compartment to overlie said floor in proximity to the juncture of said floor and said end wall, said primary chamber having its longitudinal axis extending between said side walls, said primary chamber being expansible transversely of said longitudinal axis upon inflation while retaining a substantially constant longitudinal dimension, said secondary chamber positioned to overlie said primary chamber and said floor between said discharge opening and said end wall, means securing said secondary chamber to the opposed side walls along parallel lines slanting upwardly from adjacent said discharge opening to the end wall, the sequential inflation of said primary and secondary chamber lifting the granular material above the angle of repose of said material to cause the material to slide to and out said discharge opening.

4. A self-unloading apparatus for discharging granular material from a compartment having a floor, opposed side walls, an end wall extending upwardly from said floor between the said side walls, and a discharge opening in the floor spaced inwardly of said end wall, comprising a primary and secondary air chamber, said primary chamber formed from a flexible, air impervious material to be inflatable, a mounting flange securing said primary chamber to said end wall along a horizontal line spaced upwardly from said floor so that the primary chamber overlies said floor in proximity to the juncture of said floor and said end wall, the longitudinal axis of said primary chamber paralleling said flange and being no greater in dimension than the distance between said side walls, inflation of said primary chamber expanding the said primary chamber only transversely of said longitudinal axis, said secondary chamber positioned to overlie said primary chamber and said floor between said discharge opening and said end wall, means securing said secondary chamber to the opposed side walls along parallel lines slanting upwardly from adjacent said discharge opening to the end wall, the sequential inflation of said primary and secondary chamber lifting the granular material above the angle of repose of said material to cause the material to slide to and out of said discharge opening.

5. A self-unloading apparatus for discharging granular material from a compartment having a floor, opposed side walls, an end wall extending upwardly from said floor between the said side walls and a discharge opening in the floor spaced inwardly of said end wall, comprising a primary and a secondary air chamber, said primary chamber formed from a flexible, air impervious material and inflatable to a pillow-like shape, a mounting flange along one side of said primary air chamber, said mounting flange secured to said end wall along a horizontal line spaced upwardly from said floor so that the primary chamber overlies said floor in proximity to the juncture of said floor and said end wall, the longitudinal axis of said primary chamber paralleling said flange and being no greater in dimension than the distance between said side walls, means for inflating said primary chamber, inflation of said primary chamber expanding the said primary chamber only transversely of said longitudinal axis, said secondary chamber positioned to overlie said primary chamber and said floor between the discharge opening and said end wall, means securing said secondary chamber to the opposed side walls along parallel lines slanting upwardly from adjacent said discharge opening to a horizontal line spaced upwardly from the horizontal line along which the primary chamber is attached to the end wall, further means securing said secondary chamber to the floor along said discharge opening, means sequentially to inflate said primary and then said secondary chamber, the sequential inflation of said chambers lifting said granular material above the angle of repose of said material to cause material to slide to without said discharge opening.

6. A self-unloading apparatus as defined in claim 5 having means to inflate said primary chamber to a pressure of three pounds per square inch and means to sequentially inflate said secondary chamber to a pressure of three-quarters of a pound per square inch.

No references cited.

UNITED STATES PATENT OFFICE
CERTIFICATE OF CORRECTION

Patent No. 3,139,998　　　　　　　　　　　　　　　　　　July 7, 1964

Norman R. Seaman

It is hereby certified that error appears in the above numbered patent requiring correction and that the said Letters Patent should read as corrected below.

Column 1, line 23, for "funnel-liked" read -- funnel-like --; column 2, line 51, for "secured to" read -- secured in --; column 4, line 14, for "pulverlant" read -- pulverulant --.

Signed and sealed this 1st day of December 1964.

(SEAL)
Attest:

ERNEST W. SWIDER
Attesting Officer

EDWARD J. BRENNER
Commissioner of Patents